July 10, 1923.
C. SOLTESZ
HORSESHOE
Filed May 14, 1921
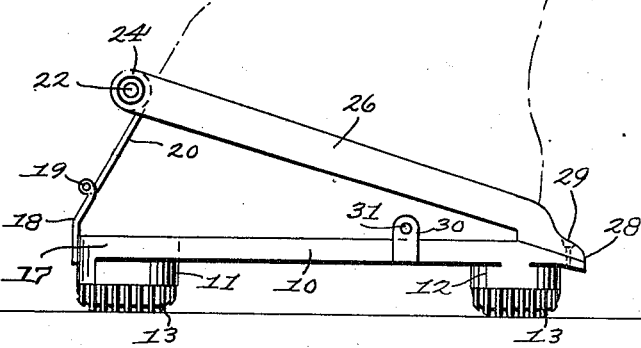
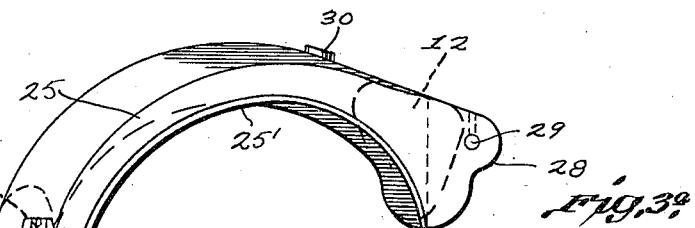
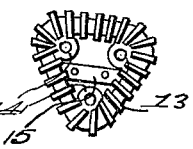
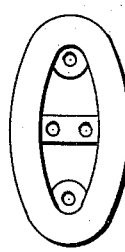
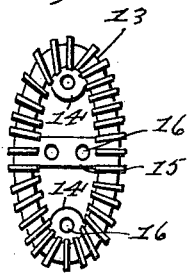
Inventor
Charles Soltesz
By his Attorney
George C. Heinitz Patented July 10, 1923.

1,461,333

UNITED STATES PATENT OFFICE.

CHARLES SOLTESZ, OF NEW YORK, N. Y., ASSIGNOR OF ONE-HALF TO JOSEF R. HLADISH, OF NEW YORK, N. Y.

HORSESHOE.

Application filed May 14, 1921. Serial No. 469,404.

*To all whom it may concern:*

Be it known that I, CHARLES SOLTESZ, a citizen of the United States, residing at New York, county of New York, and State of New York, have invented certain new and useful Improvements in Horseshoes, of which the following is a specification.

This invention relates to improvements in horseshoes, and it is the principal object of the invention to provide the tread member of a shoe with a plurality of curved bodies having a lower corrugated ground-engaging face for preventing the animal from slipping upon bad roads, and an upper flat tread-engaging face allowing a convenient attachment of the tread member.

Another object of the invention is to provide a horseshoe of this character which is simple in its construction, inexpensive to manufacture, and which is conveniently and readily attached to the hoof of an animal or removed therefrom.

With these and other objects in view my horseshoe consists of the novel construction which is more fully described in the following specification and illustrated in the accompanying drawing forming a material part of this disclosure, and in which:

Figure 1 is a side elevation of a horseshoe constructed according to the present invention and illustrating its adaptation to the hoof of an animal;

Fig. 2 is a top plan view thereof with one of the holder members swung out of its hoof-engaging position;

Fig. 3 is a bottom plan detail view of a toe part of the shoe;

Fig. 3ª is a cross-section on line 3ª—3ª of Fig. 3;

Fig. 4 is a side view thereof;

Fig. 5 is a view similar to Fig. 3 showing a rubber toe part for use in summer; and Fig. 6 is a bottom plan view of a heel part of the shoe.

The body or tread member 10 of the horseshoe is provided on its lower or tread face with a toe member 11 and the heel plates 12, to which are attached the means for preventing the animal from slipping, particularly in winter upon bad roads, as for instance the curved corrugated bodies 13 of somewhat semicircular or rounded cross-section having a smooth or flat toe or heel engaging lower face, and which are secured to the toe or heel parts by means of eyes 14 and a bar 15 provided with holes 16 for the passage of the fastening screws or the like.

In Fig. 5 a toe plate 13', preferably made of rubber and intended for summer wear, is illustrated which is adapted to be secured to the horseshoe in a manner similar to the plate 13.

To the toe part 17 of the shoe the lower arm 18 of a connection is secured with its lower end, and the free upper end of this connection is hingedly attached, as at 19, to the lower end of the upper arm 20 of the connection.

The free upper end of the arm 20 carries a sleeve 21 through the central bore of which a screw 22 is passed which also passes into the sockets 23 and 24 at the inner ends of a pair of curved holder arms 25 and 26 respectively provided with a rubber lining 25' and 26' at their inner edges, and one end of the screw is provided with the usual head 27 embedded into the socket 23. The outer ends of the arms 25 and 26 are set off as at 28 to form flat engaging faces which are pivotally secured as at 29 to the upper similarly set off and slanting faces at the heel ends of the tread member 10.

Upstanding lugs 30 are provided at the outer side edges of the member 10 and provided with holes 31 for the passage of fastening means as screws or the like.

While I have described and shown the preferred embodiment of my invention, it will be understood that changes may be made in the general construction and minor details of my improved horseshoe without departing from the spirit and scope of my invention.

Having thus described my invention, what I claim as new and desire to secure by Letters Patent of the United States is:

In a horseshoe of the class described including a tread member, a plurality of curved bodies having a substantially semicircular cross-section, a lower corrugated ground-engaging face on each of said bodies, and an upper flat tread-engaging face, eyes on said bodies allowing the passage of fastening means for fastening said bodies to said tread, and a cross-bar for strengthening said bodies.

In testimony whereof I have affixed my signature.

CHARLES SOLTESZ.